United States Patent

Drexel

[15] 3,650,151
[45] Mar. 21, 1972

[54] FLUID FLOW MEASURING SYSTEM

[72] Inventor: Charles F. Drexel, Rolling Hills Estates, Calif.

[73] Assignee: Tylan Corporation

[22] Filed: Nov. 18, 1970

[21] Appl. No.: 90,556

[52] U.S. Cl............................73/194 M, 73/29, 137/101.19
[51] Int. Cl. .........................................................G05d 11/00
[58] Field of Search..............73/194 R, 194 E, 194 M, 195, 73/196, 29; 137/101.19

[56] References Cited

UNITED STATES PATENTS

| | | | |
|---|---|---|---|
| 2,739,478 | 3/1956 | Offner | 73/196 |
| 2,797,746 | 7/1957 | Bourek et al | 137/101.19 X |
| 2,917,066 | 12/1959 | Bergson | 73/29 X |
| 3,083,569 | 4/1963 | Thomas et al. | 73/194 M |
| 3,304,766 | 2/1967 | Hubby | 73/196 X |
| 3,324,720 | 6/1967 | Sutherland | 73/196 UX |

*Primary Examiner*—Charles A. Ruehl
*Attorney*—Nilsson, Robbins, Wills & Berliner

[57] ABSTRACT

A control system for the vaporization of a liquid by a carrier gas in which the carrier gas passes through a first set of resistance elements in a terminal conductivity cell, then through a mass flow sensor and, via a throttling valve, into a vaporizing tank of diluent where the carrier gas picks up diluent vapor and then passes through a second set of resistance elements in the thermal conductivity cell. The resistance elements are connected in a bridge circuit yielding an output voltage representing the volume ratio of diluent to carrier gas. This voltage is multiplied by the voltage derived from the mass flow sensor to yield a voltage which represents the absolute value of mass flow rate of diluent. This value is compared to a desired value, the differential being amplified and utilized to control the throttling valve.

9 Claims, 3 Drawing Figures

PATENTED MAR 21 1972

3,650,151

INVENTOR.
Charles F. Drexel.
BY
Nilsson, Robbins, Wills & Berliner
Attorneys

FLUID FLOW MEASURING SYSTEM

FIELD OF THE INVENTION

The field of art to which the invention pertains includes the field of valves and valve actuation, particularly with respect to flow regulation.

BACKGROUND AND SUMMARY OF THE INVENTION

In certain chemical processes, a liquid is vaporized by passing a carrier gas through or over it, the carrier gas carrying the vaporized liquid into a reaction chamber, or the like. For example, in the fabrication of semiconductors, hydrogen as a carrier gas can be bubbled through liquid silicon tetrachloride, the mixture diluted further with hydrogen and the resulting mixture fed into a reaction chamber. In the reaction chamber, a portion of the silicon tetrachloride can be made to pyrophorically react to form a pure silicon deposit in the form of an epitaxial layer on semiconductor wafers. The rate of deposition is related to the relative amount of silicon tetrachloride present in the reaction chamber. Accordingly, it is desirable to accurately control the amount of silicon tetrachloride picked up by the carrier gas. It is also desirable to know the absolute flow rate of the silicon tetrachloride so that the results may be correlated and, in some applications, so that the entire process can be computer-controlled.

In present technology, the rate of silicon tetrachloride pickup is controlled by simultaneously regulating parameters such as hydrogen gas pressure, hydrogen gas temperature, hydrogen gas volume flow rate, silicon tetrachloride temperature, silicon tetrachloride liquid level and the temperature of the hydrogen silicon tetrachloride plumbing lines. Each of the foregoing parameters affect the flow rate of the silicon tetrachloride to the reaction chamber and they are controlled to the extent necessary to achieve satisfactory results. Performance is generally judged by testing the semiconductor wafers after the epitaxial deposition process is completed and after they have been removed from the reactor. It will be appreciated that the foregoing method does not give an indication of absolute mass flow rate, but allows judgments to be made in a trial-and-error process. Parameters are varied from batch to batch until the depth and quality of the deposited layer is within specification.

Other similar processes in semiconductor manufacturing require close control. For example, doping of semiconductors is frequently accomplished by vaporizing liquids such as borontribromide, phosphorous oxychloride and phosphorous trichloride. The problems are similar to those noted with respect to carrier gas vaporization of silicon tetrachloride.

In contrast to the state of the art methods described above, the present invention permits the absolute mass flow rate of a fluid to be controlled and monitored regardless of changes in pressures, temperatures, levels or any other variables. In accordance with the present invention, the volume ratio of fluid to be metered to carrier gas is monitored and a signal in the form of a voltage is generated in correspondence to the ratio. Simultaneously, the mass flow of the carrier gas is monitored and a second signal in the form of a voltage is generated in correspondence thereto. The ratio and mass flow voltage signals are then multiplied to yield a third signal in the form of a voltage which represents the absolute mass flow rate of the metered fluid. The fluid can be in the form of a vaporized liquid or diluent, as described hereinafter in more detail, or in the form of a gas or sublimed solid. In order to achieve control, the signal voltage representing flow of metered fluid is compared to a command signal of desired value. Any differential is amplified and utilized to power an actuator on the valve which controls the flow of the carrier gas into the metered fluid. Feedback is thus by means of the gas line.

DETAILED DESCRIPTION

As required, a detailed illustrative embodiment of the invention is disclosed herein. However, it is to be understood that this embodiment merely exemplifies the invention which may take many forms radically different from the specific illustrative embodiment disclosed. For example, while feedback is disclosed as accomplished by means of the carrier gas line, electrical or other feedback methods can be provided. Similarly, while the present system is illustrated with respect to vaporization of a liquid with gas, the control system can also be reset to mix only gases, for example, by utilizing desired signals to control a jet pump or atomizer. Similarly, the amount of sublimating solid can be controlled by varying the flow rate of carrier gas through a bed of the solid. Furthermore, the measurement aspects of the present invention can be utilized separately and independently of control mechanisms. Other modifications will be evident upon reading the following specification.

Figure 1:
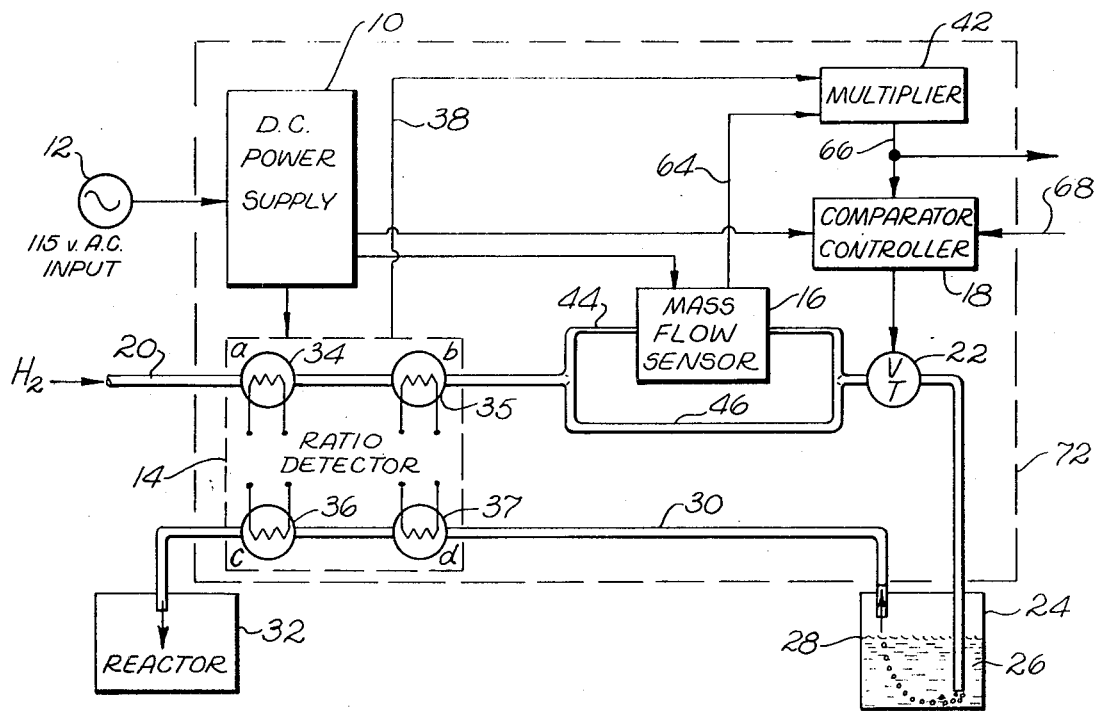
FIG. 1 is a block diagram of the operation of the present control system.

Referring simultaneously to both FIGS. 1 and 3, the system includes a DC power supply 10 energized via a transformer by a 115 volt AC input source 12 and which feeds power to a ratio detector 14, a mass flow sensor 16 and a comparator controller 18, the purpose and function of which will be described in more detail hereinafter. Tubing 20 is utilized to convey carrier gas through one-half of the ratio detector 14, from there through the mass flow sensor 16 and, via a throttling valve 22, into a vaporizing-type tank or liquid trap 24 of diluent 26, such as liquid silicon tetrachloride. The carrier gas, such as hydrogen, bubbles through the diluent 26, picking up vaporized liquid and carrying it into the upper end of the tank 24, above the liquid level 28 where it passes into tubing 30. The tubing 30 carries the mixture of carrier gas and vaporized liquid into the other half of the ratio detector 14 and from there into a phrophoric reactor 32, as known to the art, to deposit pure silicon on semiconductor wafers, or the like.

Figure 3:
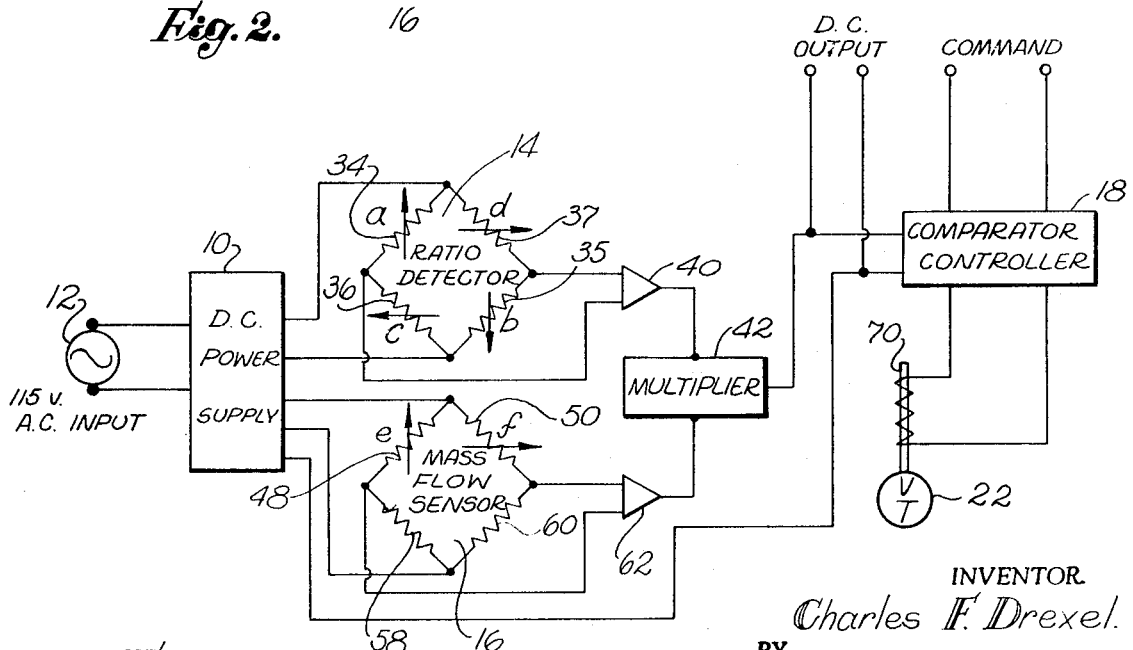
FIG. 3 is a partially schematic circuit diagram of the system of the present invention.

The ratio detector 14 is defined by a thermal conductivity cell which consists of four resistance thermometer elements 34–37, indicated by the letters $a$–$d$ respectively in the circuit of FIG. 3, contained in an isothermal housing. The thermal conductivity cell is a diffusion-type cell to avoid the effect of the ratio of carrier gas flow. Although the arrangement illustrated has four active elements, the thermal conductivity cell or ratio detector 14 can be construed with two of the elements, $a$ and $d$, as resistance thermometer elements while the remaining two elements $b$ and $c$ can be defined by fixed resistors, in which case one-half of the output of the cell as illustrated would be obtained. The resistance elements 34–37 are connected in a bridge arrangement and supplied with a constant voltage from the DC power supply 10. Alternatively, a constant current source can be utilized on the supply voltage can be scheduled to give a linear bridge output by use of positive feedback from the bridge output amplifier 40.

The thermal conductivity cell 14 is constructed so that carrier gas upstream from the diluent tank 24 passes through two of the resistance thermometer elements 34 and 35. The mixture of vaporized gas and diluent downstream of the diluent tank 24 passes through the other two resistance thermometer elements 36 and 37, and from there out of the thermal conductivity cell to the reactor 32. Since the resistance elements 34–37 are components of a bridge circuit, the output of the thermal conductivity cell is a function of the relative thermal conductivity of the two gas streams. The following equation described the cell output for the case of a constant voltage bridge supply.

$$E_o = \frac{E_B(Kg - Km)}{\frac{0.59(Z + CKg)(Z + CKm)}{CR_o \alpha I_o 2} - 2\frac{Z}{C} - (Kg - Km)}$$

where $E_o$ = output of bridge, volts $E_B$ = bridge supply voltage, volts
$\alpha$ = temperature coefficient of resistivity of element, ohms/ohm-degree (°F.)
$R_o$ = element resistance at reference temperature, ohms
$C$ = constant for cell from geometry
$Z$ = constant for cell from conduction losses
$Kg$ = thermal conductivity of carrier, B.t.u./hr.-degree-ft.
$Km$ = thermal conductivity of mixture, B.t.u./hr.-degree-ft.
$I_o$ = current through element, amps The signal voltage output of the thermal conductivity cell 14 is applied thru an amplifier 40 as indicated by the line 38 (FIG. 1) to a voltage multiplier 42.

Figure 2:
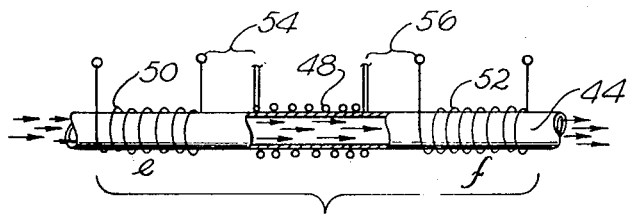
FIG. 2 is a detailed, schematic view of a mass flow sensor which can be utilized in the present system.

Upon leaving the thermal conductivity cell 14, the carrier gas upstream of the diluent tank 24 is conducted through a sampling tube 44 in parallel with a bypass tube 46 and from there is conducted through the throttling valve 22 into the diluent tank 24, as hereinbefore indicated. Referring additionally to FIG. 2, the mass flow sensor 16 is defined by a heater element 48, wound on the sampling tube 44, and a pair of resistance thermometer elements 50 and 52, indicated by the letters $e$ and $f$ in the circuit diagram of FIG. 3, also wound on the tube and spaced equidistant from the heater element 48, as indicated at 54 and 56. As shown in FIG. 3, the resistance elements 50 and 52 are connected with fixed resistors 58 and 60 as a bridge circuit component which is part of a signal conditioner that electronically provides a linear output voltage as a function of mass flow. This voltage is applied through an amplifier 62 (FIG. 3) and, as indicated by the line 64 (FIG. 1), is then applied to the remaining terminal of the voltage multiplier 42. Other types of flow sensors can be used which provide an electrical signal-vs. flow function.

At the multiplier 42, the output of the ratio detector 14 is multiplied by the output of the mass flow sensor 16. The result is a signal voltage which corresponds to the absolute value of mass flow rate of the diluent 26. This signal voltage is applied as indicated by the line 66 to the comparator controller 18 where it is compared to a command signal as indicated by the line 68 (FIG. 1) which is set at a desired value. The differential between the command signal voltage and the multiplier signal voltage, if any, is amplified and utilized to power an actuator 70 (FIG. 3) for the throttle valve 22. The throttle valve 22 is thus controlled so that it opens more when the comparator control indicates that the mass flow rate of diluent is insufficient to balance the command signal, and is closed more when the opposite situation occurs. The gas lines 20 and 30 into and out of the ratio detector 14 define a closed loop yielding stabilizing feedback. The components of the system which are shown enclosed by the dashed line 72 in FIG. 1 can be contained in a single package.

In summary of operation, hydrogen gas is fed through the tubing 20, passes through the resistance thermometer elements 34 and 35 in one-half of the ratio detector 14 and from there passes via the bypass tube 46 through the throttling valve 22 into the diluent tank 24. From there, the carrier gas picks up diluent in vaporized from and is carried by the tubing 30 through resistance thermometer elements 37 and 36 in the other half of the ratio detector 14, whereupon it is applied to the phrophoric reactor 32. A portion of the carrier gas upstream of the throttle valve 22 is passed through the mass flow sensor 16 via the sampling tube 44. Signal voltages from the ratio detector and mass flow sensor are applied to the multiplier 42 where they yield a control signal which is representative of the absolute value of mass flow rate of the diluent 26 and which is applied to the comparator controller 18 for modulation of the throttle valve 22. The result is accurate and automatic monitoring and modulation of flow rate of diluent 26 in accordance with a predetermined standard, without need for monitoring or regulating the carrier gas pressure or temperature, temperature of the plumbing or level or temperature of the diluent liquid.

While the foregoing description has been concerned with a particular control system, various modifications as previously outlined, can be made. For example, by eliminating the control valve 22, comparator controller 18 and command signal 66, the device serves as a flowmeter to measure the mass flow rate of diluent.

I claim:

1. A measuring system for determining the amount of first fluid carried by a carrier gas, comprising:
    means for mixing said carrier gas with said first fluid,
    means for monitoring the ratio of said mixed first fluid to said carrier gas and generating a first signal in correspondence to said ratio;
    means for monitoring the mass flow of said carrier gas and generating a second signal in correspondence thereto; and
    means for multiplying said first and second signals to yield a third signal in representation of the mass flow of said first fluid.

2. The invention according to claim 1 including means for modulating the flow of said carrier gas in correspondence to said third signal.

3. The invention according to claim 1 in which said ratio monitoring means comprises a thermal conductivity cell and means for passing said first fluid mixed with said carrier gas through said cell to generate said first signal.

4. The invention according to claim 3 in which said thermal conductivity cell comprises a diffusion-type cell.

5. The invention according to claim 1 in which said ratio monitoring means comprises a thermal conductivity cell including at least one resistance element upstream of said mixing means, means for passing said carrier gas in contact with said upstream resistance element prior to passage through said mixing means, at least one resistance element downstream of said mixing means, and means for passing said first fluid mixed with said carrier gas in contact with said downstream resistance element, whereby to generate said first signal.

6. The invention according to claim 1 in which said mass flow monitor comprises a conduit for said carrier gas upstream of said mixing means, a heater element for heating said carrier gas as it passes through said conduit, and thermally responsive resistance elements on opposite sides of said heater element, whereby to generate said second signal.

7. The invention according to claim 1 in which (1) said ratio monitoring means comprises a diffusion-type thermal conductivity cell including at least one resistance element upstream of said mixing means, means for passing said carrier gas through said upstream resistance element prior to passage through said mixing means, at least one resistance element downstream of said mixing means, and means for passing said first fluid mixed with said carrier gas through said downstream resistance element, whereby to generate said first signal, and (2) said mass flow monitor comprises a conduit for said carrier gas upstream of said mixing means, a heater element for heating said carrier gas as it passes through said conduit, and thermally responsive resistance elements on opposite sides of said heater element, whereby to generate said second signal.

8. The invention according to claim 1 in which said first fluid comprises a liquid which can be vaporized by said carrier gas, and said mixing means comprises a reservoir of said liquid.

9. The invention according to claim 8 in which said liquid is silicon tetrachloride and said carrier gas is hydrogen.

* * * * *